(12) United States Patent
Brocato

(10) Patent No.: US 10,166,750 B2
(45) Date of Patent: Jan. 1, 2019

(54) STRUCTURE FOR DELIVERING PIPE FUSION MACHINE

(71) Applicant: Brocato Construction Company Inc., Batesville, MS (US)

(72) Inventor: Chris Brocato, Batesville, MS (US)

(73) Assignee: Brocato Construction Company Inc., Batesville, MS (US)

( * ) Notice: Subject to any disclaimer, the term of this patent is extended or adjusted under 35 U.S.C. 154(b) by 91 days.

(21) Appl. No.: 15/418,177

(22) Filed: Jan. 27, 2017

(65) Prior Publication Data
US 2018/0215134 A1 Aug. 2, 2018

(51) Int. Cl.
| | | |
|---|---|---|
| B29C 65/20 | (2006.01) |
| F16L 1/06 | (2006.01) |
| B32B 39/00 | (2006.01) |
| B29C 65/00 | (2006.01) |
| B29C 65/78 | (2006.01) |
| B32B 1/08 | (2006.01) |
| B32B 37/06 | (2006.01) |
| B32B 37/18 | (2006.01) |
| F16M 3/00 | (2006.01) |

(52) U.S. Cl.
CPC .............. *B32B 39/00* (2013.01); *B29C 65/20* (2013.01); *B29C 65/2092* (2013.01); *B29C 65/7841* (2013.01); *B29C 66/1142* (2013.01); *B29C 66/5221* (2013.01); *B29C 66/86521* (2013.01); *B32B 1/08* (2013.01); *B32B 37/06* (2013.01); *B32B 37/18* (2013.01); *F16L 1/065* (2013.01); *F16M 3/00* (2013.01); *B32B 2597/00* (2013.01)

(58) Field of Classification Search
CPC . B29C 65/20; B29C 65/2076; B29C 65/2092; B29C 65/7802; B29C 65/7841; B29C 66/1142; B29C 66/5221; B29C 66/8242; B29C 66/865; B29C 66/8652; B29C 66/86521; B29L 2023/22; B66F 9/12; B66F 9/122; B66F 9/125; B66F 9/127; B66F 9/14; E02F 3/34; E02F 3/3414; E02F 3/3604; E02F 3/3677; E02F 3/3681; F16L 1/065
See application file for complete search history.

(56) References Cited

U.S. PATENT DOCUMENTS

| | | | |
|---|---|---|---|
| 3,710,475 A | 1/1973 | Bronstein | |
| 4,142,642 A * | 3/1979 | Myers | E02F 3/32 280/421 |
| 5,004,398 A * | 4/1991 | Wagner | E02F 3/28 172/273 |
| 5,354,150 A | 10/1994 | Canales | |

(Continued)

*Primary Examiner* — Michael A Tolin
(74) *Attorney, Agent, or Firm* — Capitol City TechaLaw

(57) ABSTRACT

A structure for delivering a pipe fusion machine may include a base that supports a container. A hose station may be provided in the container. And a swing arm may be mounted on the base for pivot action between a stowed position and an extended position. The delivery structure may be mounted on a motorized vehicle having an on-board hydraulic fluid system. The distal end of the swing arm may support pipe fusion jaws and a pipe facer. The pipe fusion jaws and the pipe facer may be connected to the hose station via hydraulic lines, and the hose station may be connected to the vehicle's on-board hydraulic system. In this way, the vehicle's on-board hydraulic system can power the pipe fusion jaws and the pipe facer.

13 Claims, 9 Drawing Sheets

(56) References Cited

U.S. PATENT DOCUMENTS

| | | | |
|---|---|---|---|
| 5,788,790 A * | 8/1998 | Andrew | B29C 65/2092 |
| | | | 156/304.2 |
| 5,843,271 A | 12/1998 | Andrew et al. | |
| 6,212,748 B1 | 4/2001 | Porter et al. | |
| 6,550,514 B1 * | 4/2003 | Andrew | B29C 65/2084 |
| | | | 156/304.2 |
| 8,764,373 B2 | 7/2014 | Bates | |
| 9,121,164 B1 * | 9/2015 | Babiarz | E02F 3/348 |
| 2002/0174638 A1 | 11/2002 | Borgesen et al. | |
| 2006/0078384 A1 | 4/2006 | Jacob et al. | |
| 2006/0249557 A1 | 11/2006 | Bortoli | |
| 2009/0045011 A1 | 2/2009 | Niemela et al. | |
| 2009/0166444 A1 | 7/2009 | Peterson | |
| 2009/0226254 A1 | 9/2009 | Jones | |
| 2012/0285575 A1 | 11/2012 | Catha et al. | |
| 2015/0360626 A1 | 12/2015 | O'Donnell et al. | |

\* cited by examiner

STRUCTURE FOR DELIVERING PIPE FUSION MACHINE

BACKGROUND

1. Field

Example embodiments relate in general to pipe fusion machines, and more specifically, to a structure for transporting and delivering a pipe fusion machine to a job site.

2. Discussion of Related Art

Pipe fusion machines are used to build pipe lines. The machines include jaws that clamp the ends of two pipes to be joined together. A facer shaves ribbons of material from the ends to be joined together. A heater heats the ends, and then the jaws are brought together so that the ends of the pipes fuse together to form a butt joint.

Conventional machines are available in many forms. Smaller machines, which are sometimes referred to as "micro machines," can be carried by hand to the job site. Larger machines can be provided on a cart and pulled to the job site. Alternatively, a larger machine can be provided on a specialized vehicle (usually tracked or wheeled) and driven to the job site. Larger machines may utilize hydraulics to operate the jaws and usually the facer.

Although conventional machines are generally thought to provide acceptable performance, they are not without shortcomings. For example, conventional machines can be difficult to maneuver into position at the job site due to mud, uneven terrain, etc. Furthermore, the larger machines are expensive mainly due to the initial cost of the specialized and dedicated vehicle, as well as the ongoing utilization of larger, more complicated machines.

SUMMARY

According to a non-limiting embodiment, a structure is provided for delivering a pipe fusion machine. The structure may include a base, and a container may be mounted on the base. A hose station may be provided in the container. And a swing arm may be mounted on the base for pivot action between a stowed position and an extended position.

According to another non-limiting embodiment, a system for delivering a pipe fusion machine may include a motorized vehicle having an on-board hydraulic system. A base may be releasably mounted on the motorized vehicle. A container may be mounted on the base. A hose station may be provided in the container. And a swing arm may be mounted on the base for pivot action between a stowed position and an extended position.

The above and other features, including various and novel details of construction and combinations of parts will be more particularly described with reference to the accompanying drawings. It will be understood that the details of the example embodiments are shown by way of illustration only and not as limitations of the invention. The principles and features of this invention may be employed in varied and numerous embodiments without departing from the scope of the invention.

BRIEF DESCRIPTION OF THE DRAWINGS

Non-limiting embodiments will become more fully understood from the detailed description below and the accompanying drawings, wherein like elements are represented by like reference numerals, which are given by way of illustration only and thus are not limiting of the present invention.

DESCRIPTION OF NON-LIMITING EMBODIMENTS

This disclosure is directed to a structure for transporting and delivering a pipe fusion machine to a job site. The individual components of pipe fusion machines and their corresponding functions are well known in this art, and the invention is not limited to any particular type of pipe fusion machine or associated component.

Throughout this disclosure, terms relating to spatial directions (e.g., upper, top, lower, bottom, front, forward, rear, rearward, proximal, distal, etc.) are used for convenience in describing features or portions thereof, as shown in the figures. These terms do not, however, require that the disclosed structure be maintained in any particular orientation.

Figure 1:
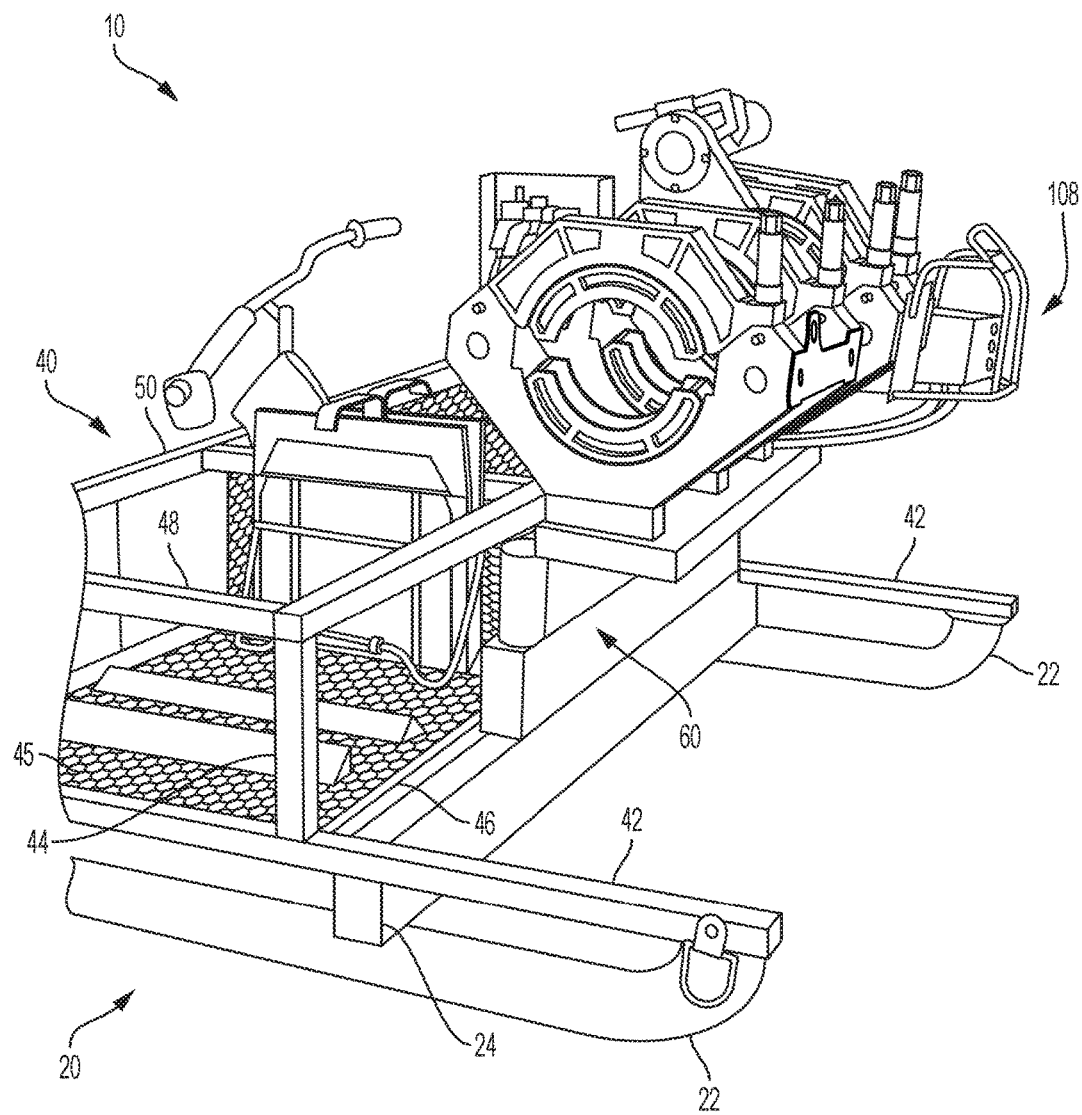
FIG. 1 is a front and left side perspective view of a structure for delivering a pipe fusion machine according to a non-limiting embodiment.
Figure 2:
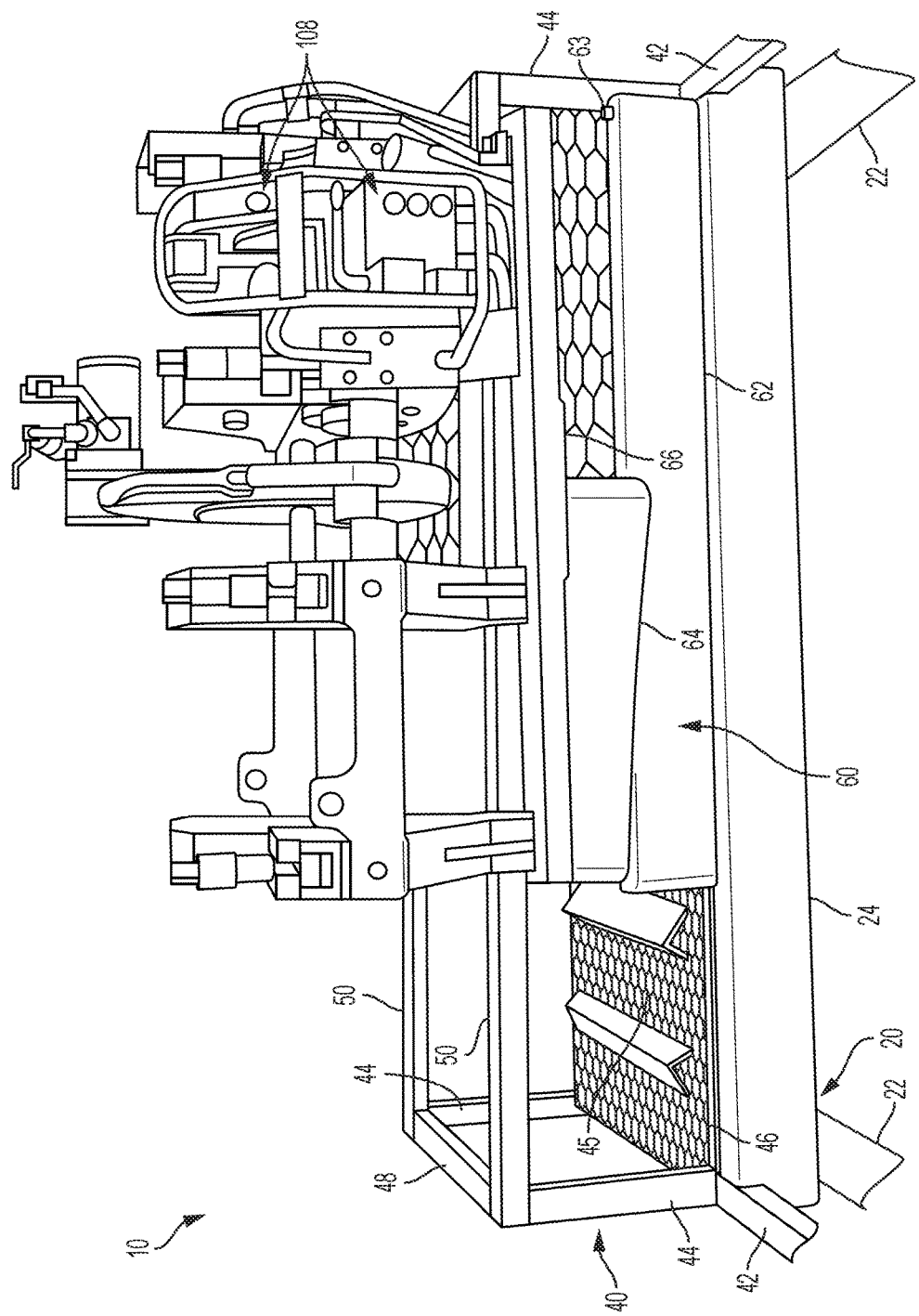
FIG. 2 is a front view of the delivery structure.

With reference to FIGS. 1 and 2, the delivery structure 10 includes a base 20 that supports a container 40 and a swing arm 60. In the illustrated embodiments, the delivery structure 10 is fabricated from steel parts. But it will be appreciated that the delivery structure may be fabricated from numerous and varied alternative materials that are well known in this art, such as other metals and/or plastics for example. Furthermore, the invention is not limited to parts having any specific dimensions. It will be readily apparent that the dimensions of the various parts can be varied depending on, for example, the application and the individual components of particular pipe fusion machine employed.

The Base:

The base 20 has two side rails 22, and a transverse rail 24 extending between the side rails 22. The front and rear ends of each side rail 22 are turned upwards. It will be appreciated that the base 20 may include additional support members, or support members having different cross-sectional shapes.

The Container:

The container 40 includes two lower side rails 42 secured to the base 20. Each lower side rail 42 extends across the transverse rail 24 and connects to the upturned ends of one of the side rails 22. Two lower transvers rails 46 extend between the two lower side rails 42. A forward one of the transverse rails 46 is situated behind the transvers rail 24. And the other transvers rail 46 is connected to the rear ends of the lower side rails 42 (see FIG. 3). The two lower side rails 42 and the two lower transvers rails 46 support an expanded metal grate 45, which forms a floor of the container 40. Four corner posts 44 are provided, with two corner posts 44 extending upward from each of the lower side rails 42. The corner posts 44 define the corners of the container 40. Two upper side rails 48 are provided, with one upper side rail 48 extending between each pair of front and rear corner posts 44. Two upper transverse rails 50 are provided. One of the upper transverse rails 50 extends between the forward ends of the upper side rails 48, and the other upper transverse rail 50 extends between the rear ends of the upper side rails 48.

Figure 3:
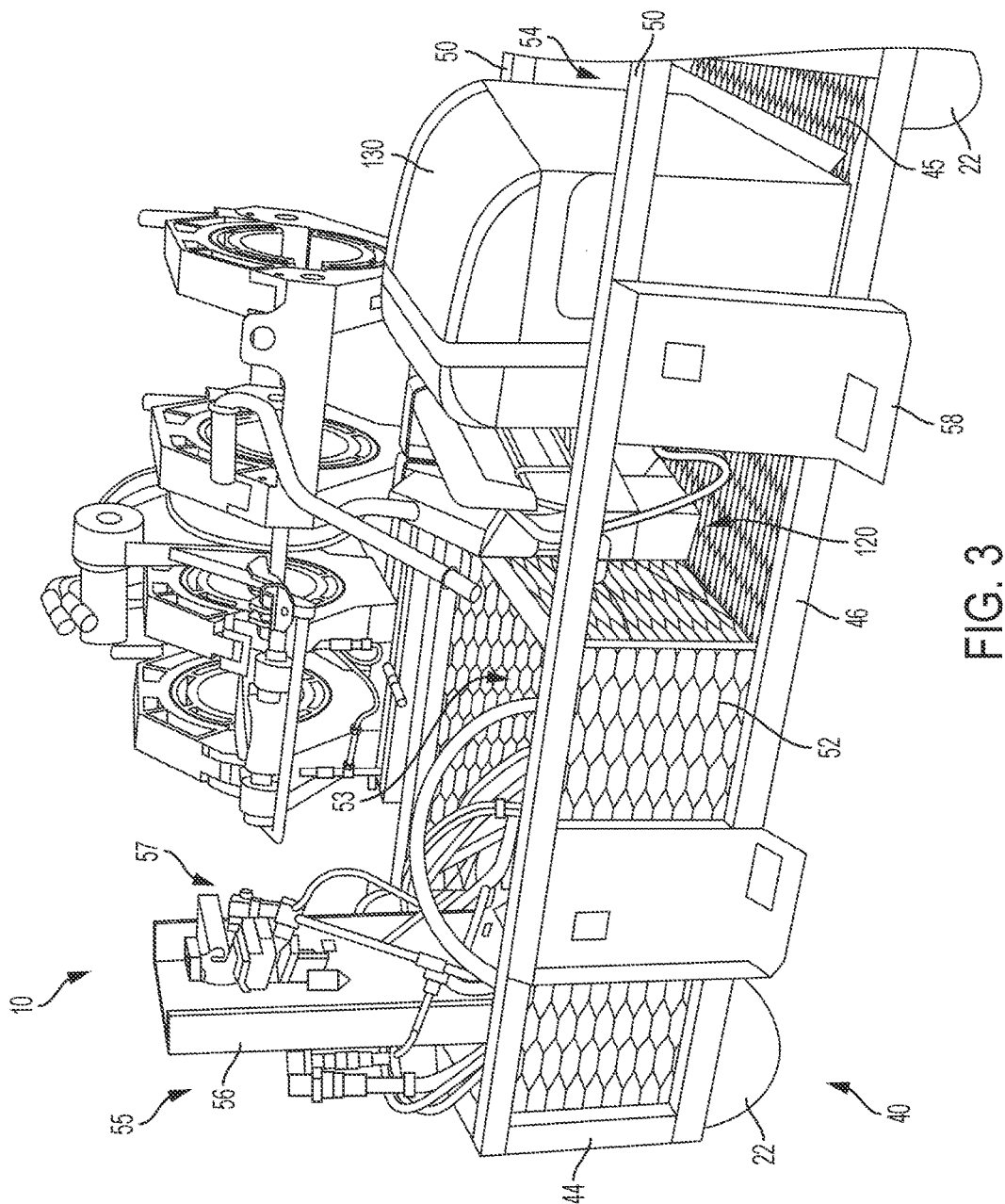
FIG. 3 is a rear and left side perspective view of the delivery structure.

Turning to FIG. 3, an expanded metal grate 52 may be connected to the corner posts 44 and extended between the upper transverse rails 50 to partition the container 40 into two compartments 53, 54. The expanded metal grate 52 defines side walls that extend around one of the compartments 53.

In the illustrated embodiment, an expanded metal grate 45, 52 is used to define the floor and side walls of the container 40. But the invention is not limited in this regard. By way of example only, solid panels may be suitably implemented, and such panels may be fabricated from numerous and varied materials, other than metal.

A hose station 55 is mounted in the compartment 53. The hose station 55 includes a frame 56 extending from the floor of the compartment 53 and secured to one of the upper side rails 48. The frame 56 supports a valve manifold assembly 57 that selectively conducts pressurized hydraulic fluid through hoses by selectively opening and closing actuatable valves in response to commands received from an operator, as will be discussed in more detail below. The hydraulic fluid hoses can be conveniently stored in the compartment 53 when not in use.

A mounting bracket 58 is provided on the rear side of the container 40. The mounting bracket 58 is fixed to the lower transverse rail 46 and the upper transverse rail 50. The mounting bracket 58 mounts on a motorized vehicle using bolts, locking pins, and/or other common mechanical mounting devices that are well known in this art. In the illustrated embodiments, the delivery structure 10 can be mounted on a skid steer loader (e.g., a bobcat). It will be appreciated, however, that the delivery structure can be manufactured to fit other vehicles used in agriculture and/or industrial locations, such as a tractor for example.

It will be appreciated that the container 40 may include additional support members, or support members having different cross-sectional shapes.

Figure 4:
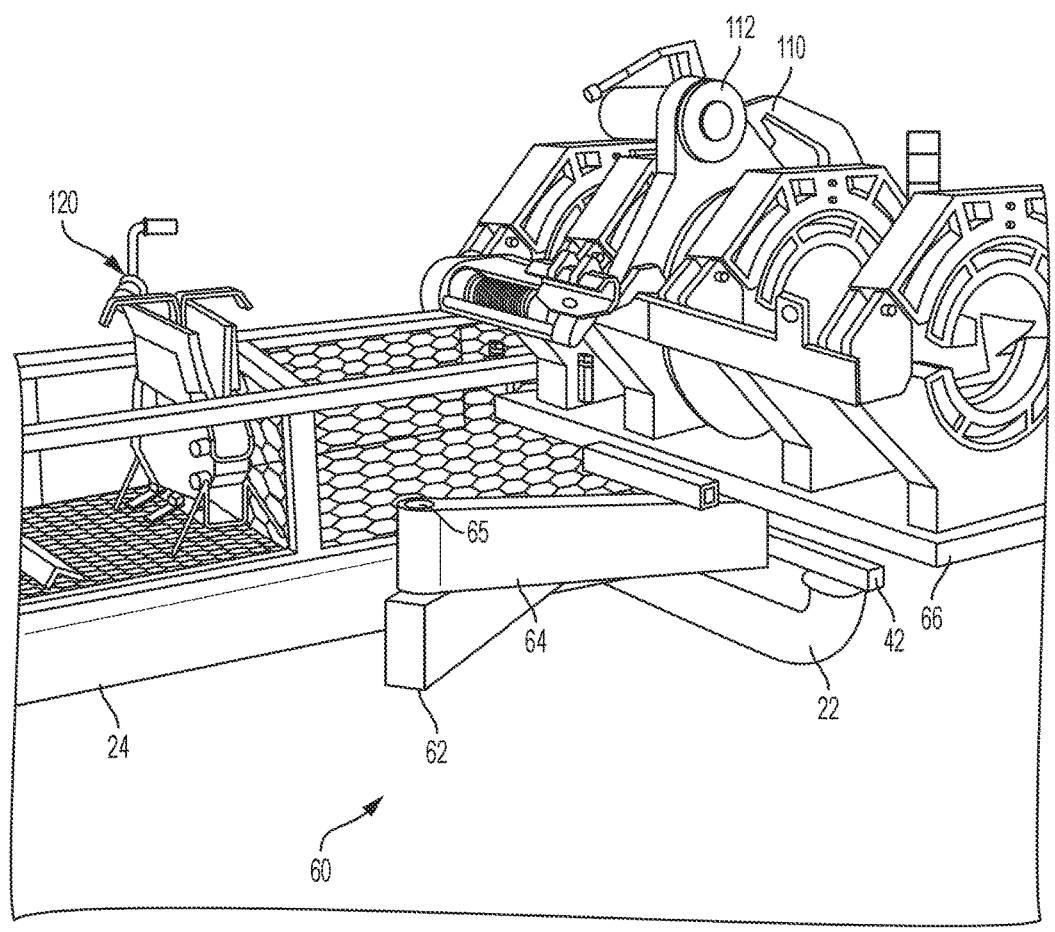
FIG. 4 is front and left side perspective view of the delivery structure, and with a swing arm partially extended.
Figure 5:
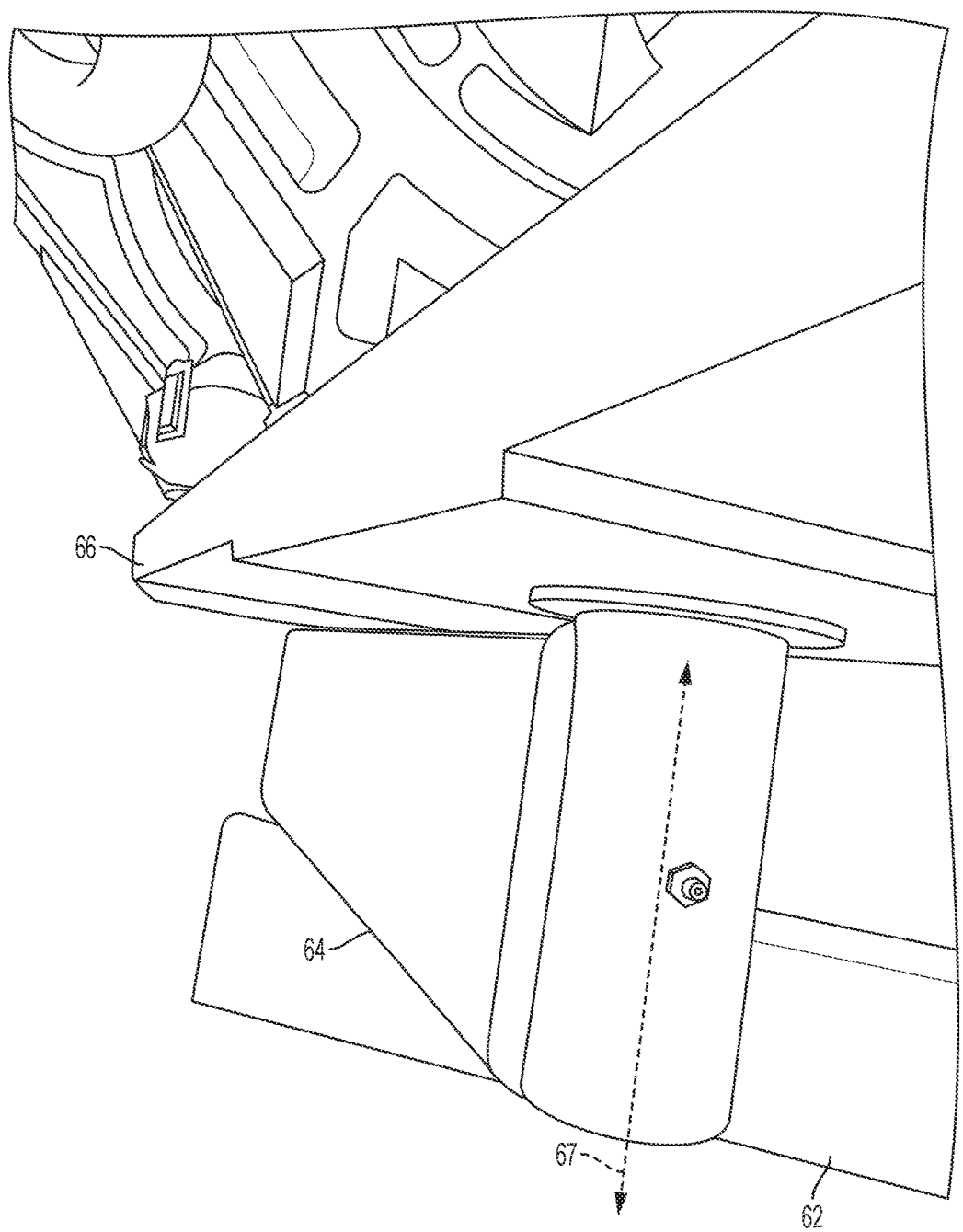
FIG. 5 is a schematic view of the swing arm.

The Swing Arm:

With reference to FIGS. 2 and 4, the swing arm 60 includes a first beam 62 mounted for pivot action about a pin 63 extended upwardly from the transverse rail 24. A second beam 64 is mounted for pivot action about a pin 65 extended upwardly from the first beam 62. A distal end of the second beam 64 includes an aperture that receives a pin (not shown) extended downwardly from the mounting platform 66, such that the mounting platform 66 is mounted for pivot action about the axis 67 of the pin (see FIG. 5). Numerous and varied pivot action joints, which are well known in this art, can be suitably implemented.

Figure 6:
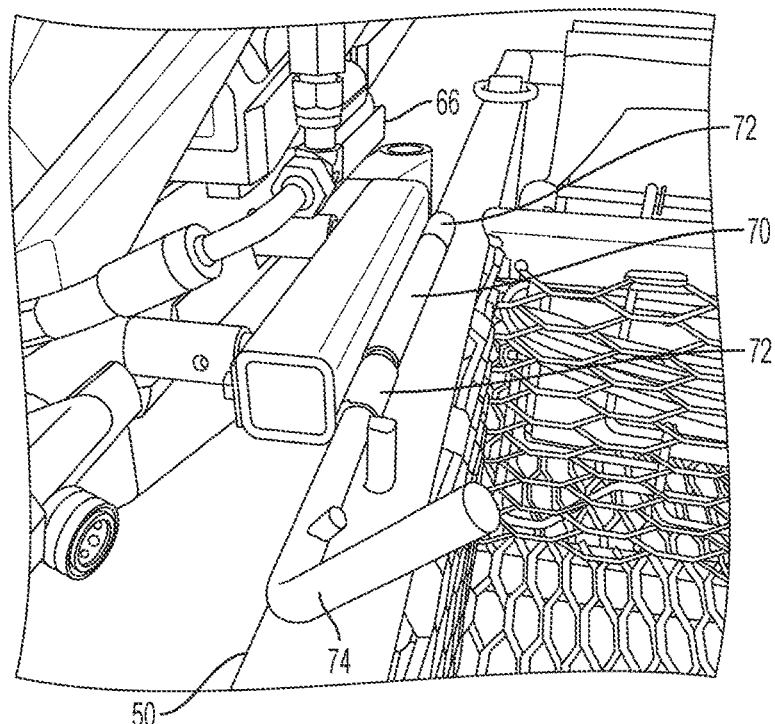
FIGS. 6 and 7 are schematic views of a latch for securing the swing arm in a stowed position.
Figure 7:
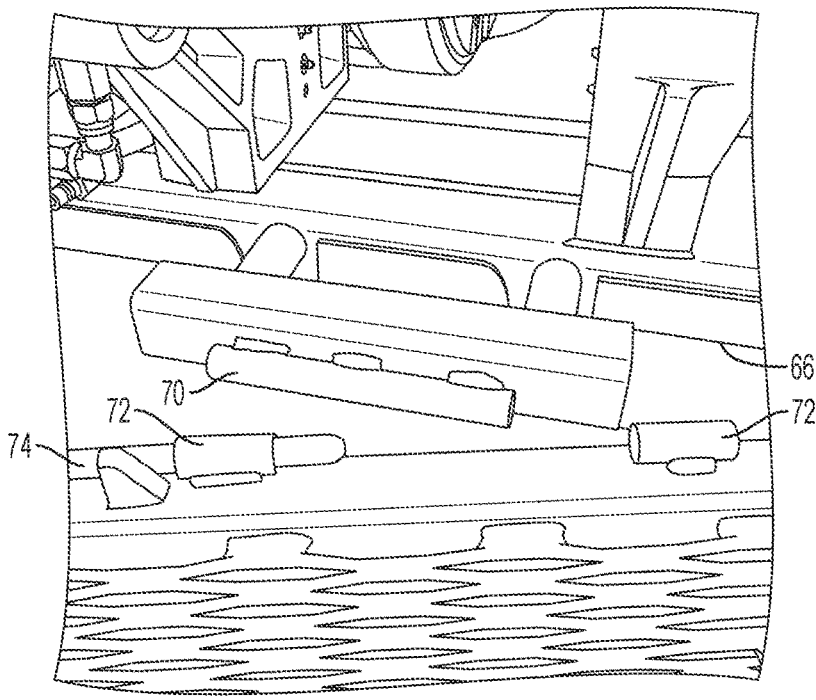

The swing arm 60 can be moved by an operator between a stowed position and an extended position. In the stowed position, the beams 62, 64 and the mounting platform 66 are stacked on top of the transverse rail 24 and the mounting platform 66 is positioned next to the container 40. As shown in FIG. 6, the swing arm 60 can be secured in the stowed position using a mechanical fastener. In this non-limiting embodiment, the fastener is in the form of a latch that includes a first barrel 70 fixed to the mounting platform 66, second barrels 72 fixed to the upper transverse rail 50 on the front of the container 40, and a bolt 74. The bolt 74 passes through the barrels 70, 72 to lock the swing arm 60 in the stowed position. As shown in FIG. 7, the bolt 74 can be removed from the barrels 70, 72 so that the mounting platform 66 can be separated from the container 40, thereby allowing the swing arm 60 to be extended. In the extended position, the swing arm 60 is cantilevered from the transverse rail 24, i.e., the swing arm 60 extends away from the transverse rail 24 without any other external support.

In the illustrated embodiment, the swing arm 60 includes three support members (i.e., the first beam 62, the second beam 64, and the mounting platform 66) that are articulated together. The invention is not limited in this regard as the swing arm may include more or less than three support members. Furthermore, the illustrated beams have a rectangular cross-sectional shape. It will be appreciated, however, that the beams may have different cross-sectional shapes.

The Pipe Fusion Machine

The pipe fusion machine receives operating power from the skid steer loader. In this non-limiting embodiment, and with reference to FIG. 8, the skid steer loader's on-board hydraulic system powers the jaws 100 and the facer 110 of the pipe fusion machine. But the invention is not limited in the regard. For example, the on-board hydraulic system could power the jaws 100 or the facer 110.

The delivery structure 10 is secured to the skid steer loader 80 via the mounting bracket 58 provided on the rear side of the container 40. Two hydraulic fluid hoses 82 are extended from the valve manifold assembly 57 and connected to ports of the on-board hydraulic system of the skid steer loader 80. One hose 82 delivers pressurized hydraulic fluid to the valve manifold assembly 57, and the other hose 82 returns hydraulic fluid back to the on-board hydraulic system.

Figure 9:
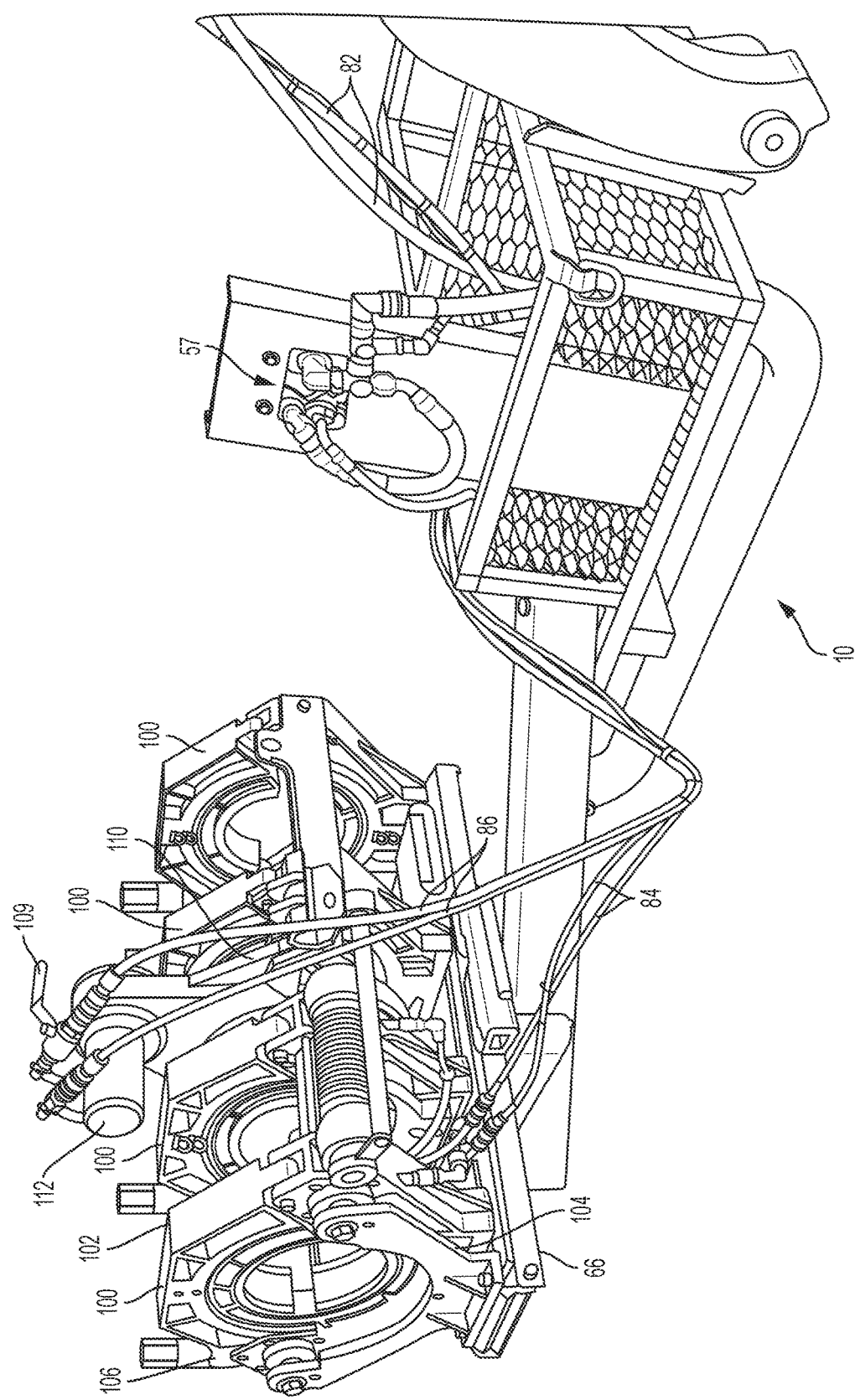
FIG. 9 is a right and rear side perspective view of the delivery structure, and with the swing arm partially extended.

Turning to FIG. 9, the jaws 100 and the facer 110 of the pipe fusion machine are mounted on the mounting platform 66. As is well known in this art, each jaw 100 includes an upper jaw part 102 and a lower jaw part 104 that are hinge coupled together. The two jaw parts 102, 104 can be opened and closed about the hinge. A clamp knob 106 is provided to manually tighten or loosen the jaw parts 102, 104. Two of the jaws 100 (the two left jaws 100 in FIG. 9) can be translated together as a unit relative to the mounting platform 66 toward and away from the other two jaws (the two right jaws 100 in FIG. 9). A hydraulic piston (not shown) is provided to impart translational movement to the moveable jaws 100 relative to the mounting platform 66. Two hydraulic fluid hoses 84 are extended from the valve manifold assembly 57 and connected to jaw controls 108 (hidden from view in FIG. 9).

Figure 10:
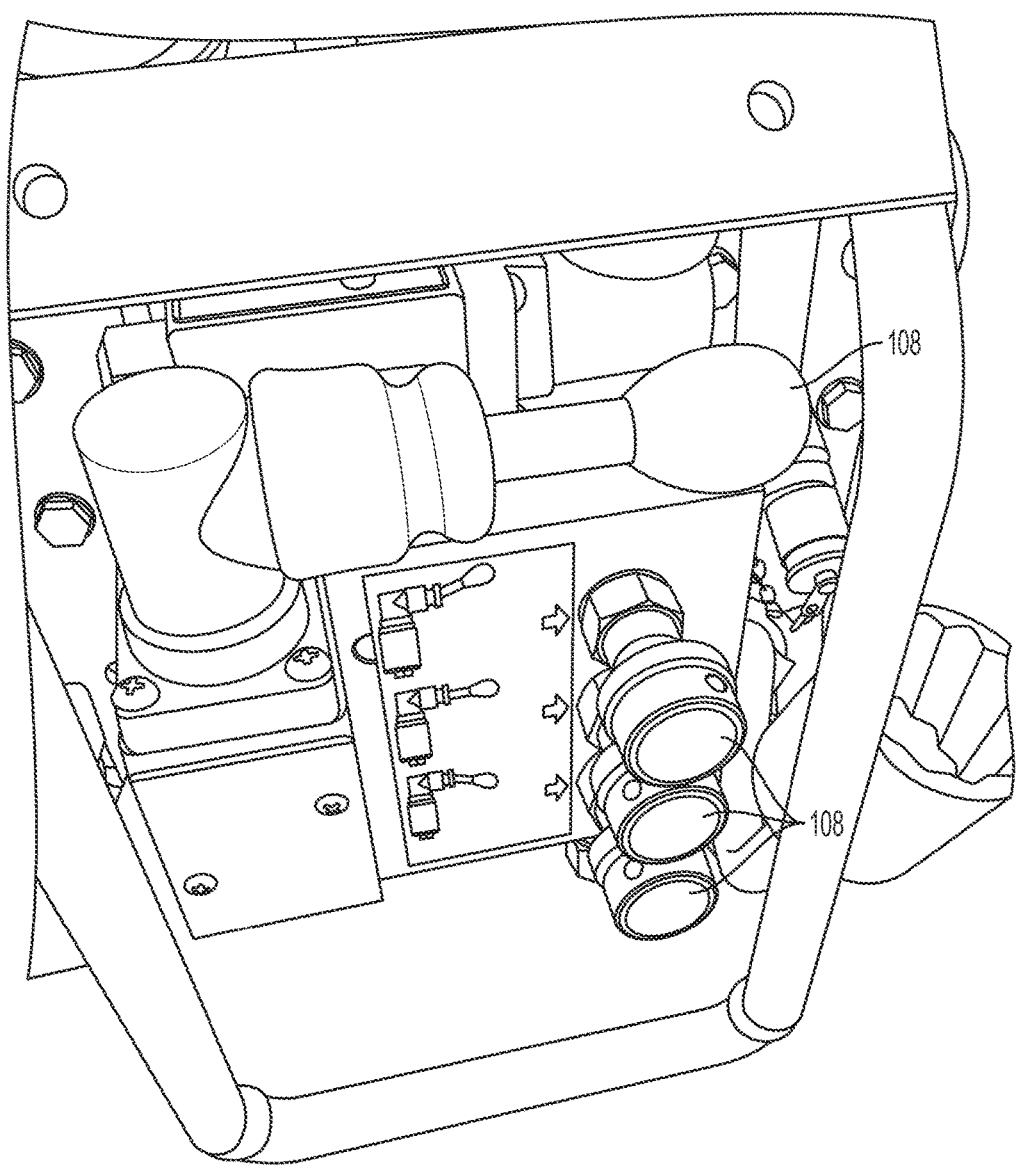
FIG. 10 is a schematic view of jaw controls mounted on the swing arm.

As shown in FIGS. 1, 2, and 10, the jaw controls 108 are provided on the mounting platform 66. The jaw controls 108 can be manipulated by an operator to selectively deliver hydraulic fluid to the piston to drive the moveable jaws 100 toward or away from the stationary jaws 100. More specifically, an operator can manipulate the controls 108 to open and close carriage control and pressure selector valves, thereby actuating the hydraulic piston to move the moveable jaws 100 toward or away from the stationary jaws 100 during a facing operation, a heating operation, and a fusion operation. The functionality of the jaws 100 and associated pressure parameters during the facing, the heating, and the fusion operations are well known in the art.

Figure 8:
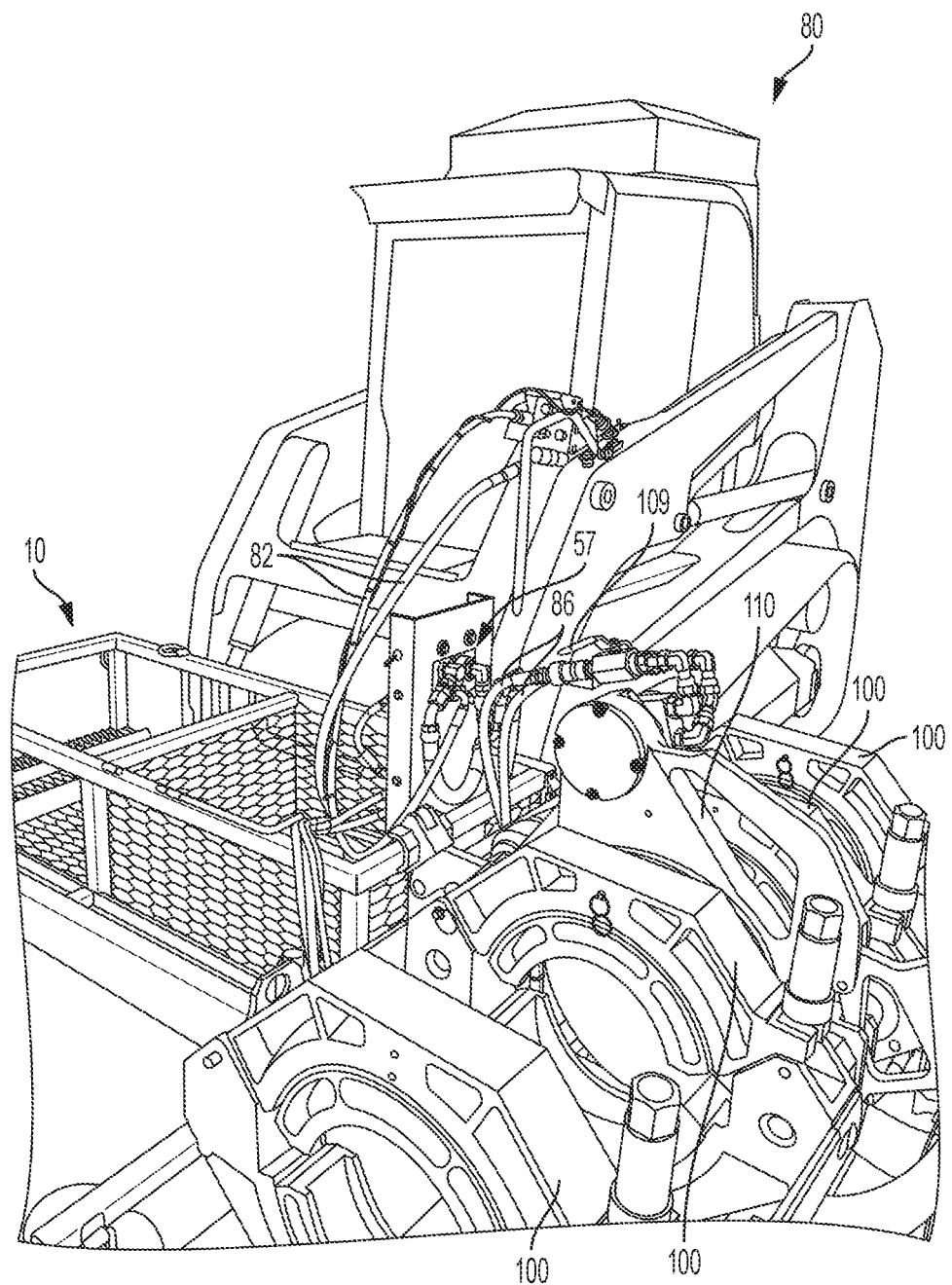
FIG. 8 is a front and right side perspective view of the delivery structure attached to a motorized vehicle.

As shown in FIGS. 4, 8, and 9, the facer 110 is conventionally situated between the moveable jaws 100 and the stationary jaws 100. The facer 110 includes blades that travel along a circular path and shave ribbons of material from the ends of the pipes to be joined together. A hydraulic motor 112 is provided to drive the blades of the facer 110. Two hydraulic fluid hoses 86 are extended from the valve manifold assembly 57 and connected to the hydraulic motor 112 for selectively delivering hydraulic fluid to drive the facer blades along the circular path. Once the pipe ends are faced, the facer 110 can be rotated upward and out of the space between the jaws 100, as is well known in this art.

With reference to FIG. 9, a facer control valve 109 is provided on the mounting platform 66. An operator can manipulate the facer control valve 109 to control the supply of hydraulic fluid (and thus the actuation of) the hydraulic motor 112.

A conventional paddle heater 120 can be stored in the compartment 54 of the container 40. As is well known in this art, the facer 110 is rotated upward and out of the space between the jaws 100 so the paddle heater 120 can be positioned in that space to heat the faced pipe ends.

The Operation

The delivery structure 10 may be stored as shown in FIG. 3. The swing arm 60 is stowed and locked to the container 40 via the latch. The hydraulic fluid hoses 82, 84, 86 are stored in the compartment 53 of the container 40. And the paddle heater 120 is stored in the compartment 54 of the container 40. The base 20 keeps the container 40, the swing arm 60, and the components of the pipe fusion machine spaced apart from the ground surface. This elevated position facilitates cleaning and inspection while the delivery structure 10 is detached from the skid steer loader. The elevated position of the container 40 also facilitates attachment of the skid steer loader 80 to the mounting bracket 58.

As shown in FIG. 3, a portable electric generator 130 can be stored in the compartment 54 of the container 40. The generator 130 can be used to power the paddle heater 120.

The skid steer loader 80 can lift and transport the delivery structure 10 and the pipe fusion machine close to a job site. The operator connects the hydraulic fluid hoses 82 to the on-board hydraulic system of the skid steer loader 80, as shown in FIG. 8. The operator also connects the hydraulic fluid hoses 84, 86 to the controls 108 (and thus the hydraulic piston) and the hydraulic motor 112, as shown in FIG. 9. It will be readily apparent that the hydraulic fluid hoses 82, 84, 86 can be appropriately connected while the swing arm 60 is in the stowed position or the extended position.

The operator removes the bolt 74 from the barrels 70, 72 so that the mounting platform 66 can be separated from the container 40. The swing arm 60 is extended to position the mounting platform 66 (and thus the jaws 100 and the facer 110) at the job site, which is the location at which the ends of the pipes are to be joined together. The pivot action of the first beam 62 relative to the transverse rail 24, the pivot action of the second beam 64 relative to the first beam 62, and the pivot action of the mounting platform 66 relative to the second beam 64 facilitates positioning of the mounting platform 66 (and thus the jaws 100 and the facer 110) within a reference plane that is parallel to the floor of the container (i.e., generally a plane that is parallel to the surrounding terrain) so that the pipes can be properly aligned with the fusion machine. Positioning adjustments in and out of the reference plane can be made by manipulating the lift arms of the skid steer loader.

Once positioned at the job site, each jaw 100 is opened by rotating the upper jaw part 102 about the hinge. The facer 110 is also rotated upward about the hinge. The pipes are loaded into the jaws 100, with one pipe being loaded into the moveable jaws 100 and the other pipe being loaded into the stationary jaws 100. The upper jaw part 102 is rotated downward and the jaw 100 is tightened around the pipe by turning the clamp knob 106. Once the pipes are loaded, the facing operation, the heating operation, and the fusion operation can be performed in sequential order.

To initiate the facing operation, the operator rotates the facer 110 downward to a position between the pipe ends. The operator manipulates the facer control valve 109 and the jaw controls 108 so that the facer 110 shaves ribbons of material from the ends of the pipes in a conventional fashion. Once facing is complete, the operator rotates the facer 110 upward and out of the space between the jaws 100.

To initiate the heating operation, the paddle heater 120 is connected to the portable generator 130 and preheated. The operator positions the paddle heater 120 between the faced pipe ends. The operator manipulates the jaw controls 108 so that the heater 120 heats the ends of the pipes in a conventional fashion. Once heating is complete, the operator removes the paddle heater 120 from the space between the jaws 100.

To initiate the fusion operation, the operator manipulates the jaw controls 108 so that the heated ends of the pipes are brought together and fused to form a butt joint. Once fusion is complete, the operator loosens the clamp knob 106 and opens the jaw 100 by rotating the upper jaw part 102 about the hinge. The pipe can be removed from the machine.

If work is complete, then the operator can return the swing arm 60 to its stowed and locked position, disconnect the hoses 82, 84, 86 and store them in the compartment 53, and return the paddle heater 120 to the compartment 54. The skid steer loader 80 can then transport the delivery structure 10 and the pipe fusion machine to the next job site, a storage site, etc.

Although the foregoing description is directed to the preferred embodiments of the present teachings, it is noted that other variations and modifications will be apparent to those skilled in the art, and which may be made without departing from the spirit or scope of the present teachings.

The foregoing detailed description of the various embodiments of the present teachings has been provided for the purposes of illustration and description. It is not intended to be exhaustive or to limit the present teachings to the precise embodiments disclosed. Many modifications and variations will be apparent to practitioners skilled in this art. The embodiments were chosen and described in order to explain the principles of the present teachings and their practical application, thereby enabling others skilled in the art to understand the present teachings for various embodiments and with various modifications as are suited to the particular use contemplated. It is intended that the scope of the present teachings be defined by the following claims and their equivalents.

What is claimed is:

1. A structure for delivering a pipe fusion machine, the structure comprising:
 a base;
 a container mounted on the base;
 a hose station including a frame provided on the container, and a valve manifold assembly supported on the frame;
 a swing arm mounted on the base for pivot action between a stowed position and an extended position;
 wherein the swing arm includes a first beam mounted on the base for pivot action relative to the base, a second beam mounted on the first beam for pivot action relative to the first beam, and a mounting platform mounted on the second beam for pivot action relative to the second beam; and a plurality of pipe fusion jaws provided on the mounting platform.

2. The structure according to claim 1, wherein in the extended position, the swing arm is cantilevered from the base.

3. The structure according to claim 1, further comprising a plurality of hydraulic fluid hoses connected between the pipe fusion jaws and the hose station.

4. The structure according to claim 1, further comprising a pipe facer mounted on the mounting platform and situated between two of the pipe fusion jaws.

5. The structure according to claim 4, further comprising a plurality of hydraulic fluid hoses connected between the pipe facer and the hose station.

6. The structure according to claim 1, further comprising a bracket fixed to the container for connection to a motorized vehicle.

7. A system for delivering a pipe fusion machine, the system comprising:
- a motorized vehicle having an on-board hydraulic system;
- a base releasably mounted on the motorized vehicle;
- a container mounted on the base;
- a swing arm mounted on the base for pivot action between a stowed position and an extended position;
- wherein the swing arm includes a first beam mounted on the base for pivot action relative to the base, a second beam mounted on the first beam for pivot action relative to the first beam, and a mounting platform mounted on the second beam for pivot action relative to the second beam; and
- a plurality of pipe fusion jaws provided on the mounting platform.

8. The system according to claim 7, further comprising a pipe facer mounted on the mounting platform and situated between two of the pipe fusion jaws.

9. The system according to claim 8, wherein the on-board hydraulic system of the vehicle powers the pipe fusion jaws and the pipe facer.

10. The system according to claim 9, further comprising a hose station including a frame provided on the container, and a valve manifold assembly supported on the frame;
- a plurality of first hydraulic fluid hoses connected between the pipe fusion jaws and the hose station;
- a plurality of second hydraulic fluid hoses connected between the pipe facer and the hose station; and
- a plurality of third hydraulic fluid hoses connected between the hose station and the on-board hydraulic system of the vehicle.

11. The system according to claim 10, wherein the valve manifold assembly is connected to the first, the second, and the third hydraulic fluid hoses; and
- wherein controls are provided on the mounting platform to selectively operate the valve manifold assembly in response to commands received from an operator, such that pressurized hydraulic fluid from the on-board hydraulic system is selectively delivered to the pipe fusion jaws and the pipe facer.

12. The system according to claim 7, wherein the vehicle is a skid steer loader.

13. A structure for delivering a pipe fusion machine, the structure comprising:
- a container including a base;
- a hose station including a frame provided on the container, and a valve manifold assembly supported on the frame;
- a swing arm mounted on the base of the container for pivot action between a stowed position and an extended position;
- wherein the swing arm includes a proximal end mounted on the base for pivot action relative to the base, a distal end that is cantilevered from the base when the swing arm is in the extended position, and a platform mounted on the distal end for pivot action relative to the distal end; and
- a plurality of pipe fusion jaws provided on the platform.

* * * * *